United States Patent [19]

Stottlemyer

[11] Patent Number: 6,088,297
[45] Date of Patent: Jul. 11, 2000

[54] ACOUSTIC SOUND SPEED PROFILING SYSTEM

[75] Inventor: Thomas R. Stottlemyer, Mystic, Conn.

[73] Assignee: The United States of America as represented by the Secretary of the Navy, Washington, D.C.

[21] Appl. No.: 09/226,625

[22] Filed: Dec. 21, 1998

[51] Int. Cl.[7] ....................................................... G01S 3/80
[52] U.S. Cl. ............................................ 367/131; 367/902
[58] Field of Search ..................................... 367/131, 902, 367/130

[56] References Cited

U.S. PATENT DOCUMENTS

| | | | |
|---|---|---|---|
| 4,992,993 | 2/1991 | Chambers | 367/902 |
| 5,734,623 | 3/1998 | Ruffa | 367/131 |
| 5,742,559 | 4/1998 | Marschall et al. | 367/20 |

*Primary Examiner*—Ian J. Lobo
*Attorney, Agent, or Firm*—Michael J. McGowan; Robert W. Gauthier; Prithvi C. Lall

[57] ABSTRACT

An acoustic sound speed profiling system is provided. The system includes a sound emitter and a series of sensors or hydrophones spaced vertically in a water column. The sound emitter is a high-frequency sound source adapted for mounting on the front end of a passive, towed sonar array. The sound source has a frequency which may be outside the acoustic aperture of the towed array. The series of sensors are located at intervals along and embedded within the array tow cable. The sensors are conventional hydrophones or thin-film hydrophone membranes. During operation of the system, the source transmits high frequency sound, which is received by each sensor along the tow cable of the towed array. Calculation of the speed of sound is determined from the position of the tow cable and the time-of-arrival of acoustic signals at each sensor. There is no interference with the normal operation of the passive towed array.

10 Claims, 2 Drawing Sheets

ACOUSTIC SOUND SPEED PROFILING SYSTEM

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION (1) Field of the Invention

The invention relates to the field of sonar measuring devices and in particular to devices for measuring the speed of sound in water.

(2) Description of the Prior Art

The use of sonar systems continues to broaden, covering depth finding, target detection, location, ranging and all traditional uses. New uses include the aiming of small underwater projectiles against relatively small incoming threats, e.g., underwater bullets fired at incoming torpedoes. Each of these new uses requires increased resolution, speed, and accuracy from a sonar tracking or aiming system. In order to provide this increased resolution, speed and accuracy, it is important to minimize errors in the measurement of signals from these threats. Significant errors can result from inaccurate sound velocity profiles in the water column. Currently the U.S. Navy uses expendable bathythermometric (XBT) devices to measure the temperature profile of the water column. From this measured temperature profile, the sound speed profile is calculated and used to improve sonar performance. These XBT devices have a number of drawbacks including the inability to measure the sound speed directly, the lack of continuous measurement, the requirement for repeated deployment intervals during a day, and the considerable debris generated with intensive use. With the rapidly changing conditions found in shallow, littoral water environments (environments having fresh water influxes), the need for a realtime continuous sound speed measurement is crucial to maintain optimum sonar performance. In these types of environments, XBT's are least effective as not only the water temperature is changing rapidly, but the salinity is also changing. Since XBT's measure the speed of sound indirectly (based on temperature), significant inaccuracies can result. Additionally, the rapidly changing conditions require even greater numbers of XBT deployments.

Other examples of prior art devices for measuring sound speed include direct measurement devices for static, non-moving systems and indirect, calculated determinations for moving systems. For example, U.S. Pat. No. 4,558,437 to Meeder et al. disclosed a static device having an emitter at the seafloor with a receive sensor located at the boat. Meeder et al. disclose a static system which measures sound pressure levels in ocean sediment, but cannot be adapted to measurement throughout the water column, nor to moving systems. Typically, moving systems depend on calculation and/or indirect measurements. U.S. Pat. No. 5,608,689 to Capell, Sr. is an example disclosing a moving system which calculates the speed of sound based on transmitting and receiving at one location (on the ship). The necessary calculations, based on multiple pulses, require a precise knowledge of transmission and reception angles.

What is needed is a realtime means for directly measuring the speed of sound profile throughout a water column. Additional measurement from a moving platform is required and measurement using a simple omni-directional sound source is preferable.

SUMMARY OF THE INVENTION

It is an object of the invention to provide an aquatic sound speed profiling system adapted to operate in freshwater, brackish water and seawater.

It is another object of the invention to provide a sound speed profiling system adapted to operate at varying water temperatures.

It is yet another object of the invention to provide a sound speed profiling system using direct measurement of the speed of sound.

It is still another object of the invention to provide a sound speed profiling system having realtime speed measurements.

Accordingly, the invention is an acoustic sound speed profiling system comprising a high-frequency acoustic source and a series of receive sensors deployed through a water column. The high-frequency acoustic source is mounted in the front end of a passive, towed array. The high-frequency source has a frequency which may be outside the bandwidth of the acoustic aperture of the towed array or threat receive arrays. The series of receive sensors are located at intervals along the array tow cable leading up to the towing ship. These sensors may be traditional hydrophones or thin film hydrophone membranes, such as polyvinylidene fluoride (PVDF). During operation of the system, the source transmits high frequency sound, which is received by each sensor along the tow cable of the towed array. Calculation of the speed of sound is determined from the position of the tow cable and the time-of-arrival of acoustic signals at each sensor. There is no interference with the normal operation of the passive towed array.

BRIEF DESCRIPTION OF THE DRAWINGS

The foregoing objects and other advantages of the present invention will be more fully understood from the following detailed description and reference to the appended drawings wherein corresponding reference characters indicate corresponding parts throughout the several views of the drawings and wherein.

DESCRIPTION OF THE PREFERRED EMBODIMENTS

Figure 1:
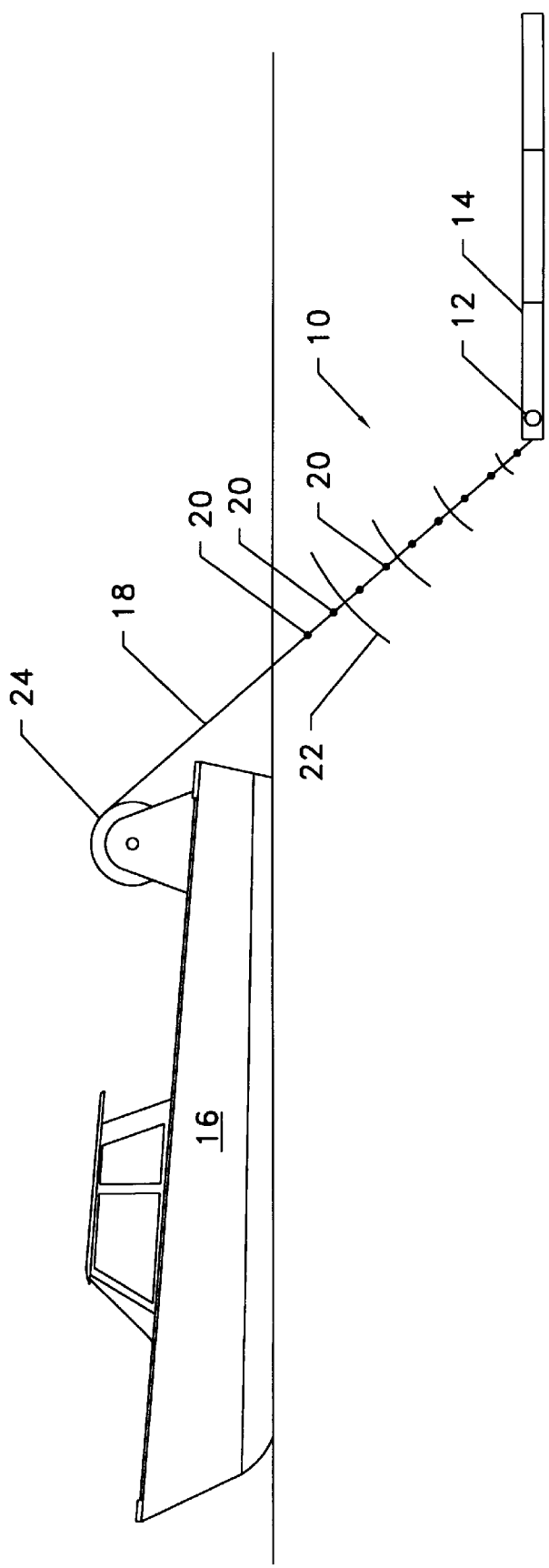
FIG. 1 is a side view sketch showing the sound speed profiling system installed on a passive towed sonar array.

Referring now to FIG. 1, the sound speed profiling system of the present invention, designated generally by the reference numeral 10, is shown with its major components. The sound speed profiling system 10 comprises a high frequency, omni-directional, acoustic source 12, mounted in the front of a passive towed sonar array 14 (an existing array serving as a mounting platform). The acoustic source 12 has a transmitting frequency which may be outside the bandwidth of the acoustic aperture of the towed array 14. This acoustic source 12 may be back-fit into an existing towed array 14 that can fulfill the power requirements of the acoustic source, or may be designed into a new development towed array. The sonar array 14 is towed from a vessel 16 with an electro-optical-mechanical tow cable 18 having an outer plastic jacket. The tow cable 18 has internal wiring and power cables (not shown) and serves as a sensor support having a plurality of sensors 20 embedded in the outer jacket of the tow cable 18. These sensors 20 measure the arrival times of the acoustic signals 22 transmitted from the acoustic source 12 located on the towed array 14. By knowing the time at which the signals 22 are transmitted from the array 14, the time that the signals 22 arrive at each of the sensors 20 on the cable 18, and the position of the tow cable, a plot of sound speed verses depth can be acquired.

Figure 2:
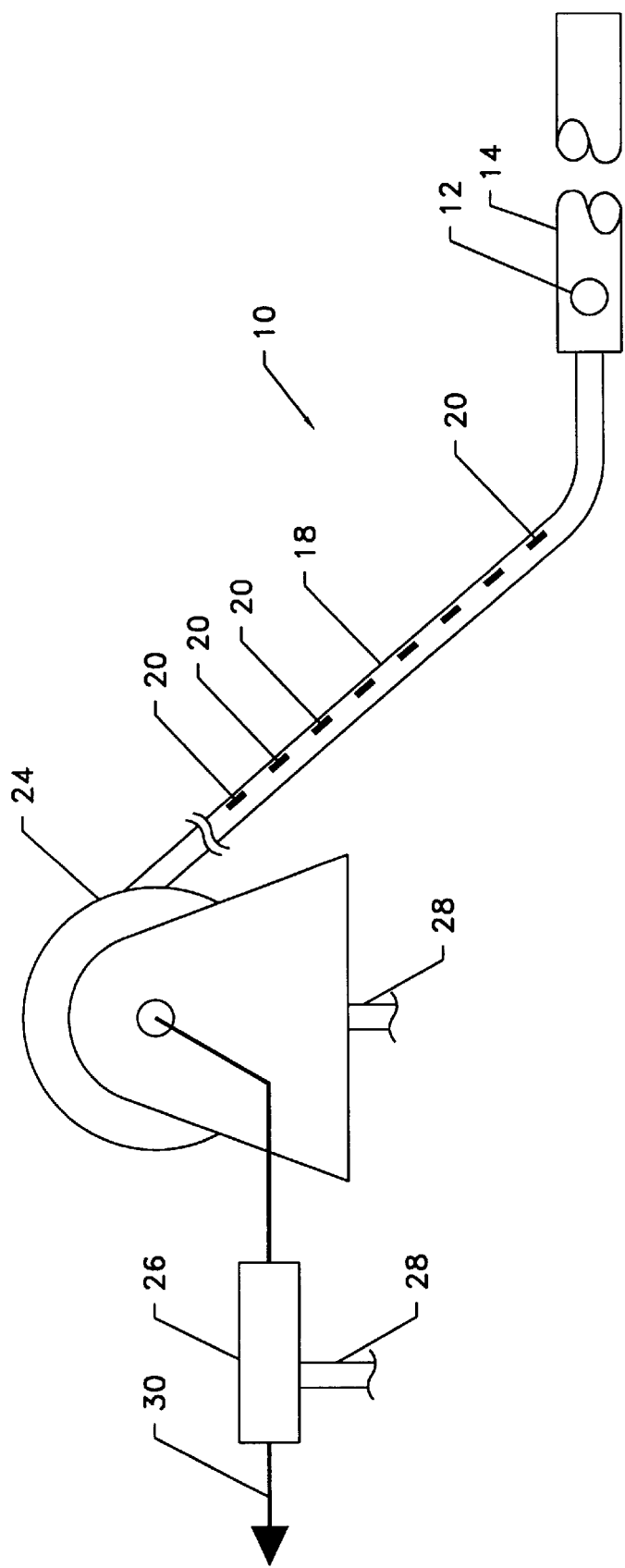
FIG. 2 is a schematic view of the sound speed profiling system.

Referring now to FIG. 2, a schematic diagram shows the operation of the sound speed profiling system 10. The acoustic source 12 is shown located on an existing passive towed sonar array 14. The tow cable 18 is a typical electro-optical, mechanical cable modified to attach sensors 20 at intervals along the cable. These sensors may be embedded in the jacket of the tow cable and may comprise optical fibers configured to detect sonar signals (such as well known Bragg grating sensors), traditional ceramic hydrophone elements, or thin-film hydrophone membranes formed with piezo-electric polymers such as polyvinylidene fluoride polymer films (PVDF). PVDF provides additional benefits as it can be manufactured in very thin films which could be embedded into the tow cable jacket without affecting the thickness or outer diameter of the tow cable jacket. The tow cable jacket also contains a plurality of electrical conductors (not shown) that transmit the signals from the sensors to the towing vessel (not shown in this figure). Onboard the towing vessel, a microprocessor and controller unit 26 operates the sound speed profiling system. The microprocessor and controller unit 26 is connected to the tow cable 18, and to the acoustic source 12 and sensors 20, through the cable handling system 24. Ship's power is connected to both the microprocessor and controller unit 26 and the tow cable 18 through the cable handler 24 as shown by connections 28. The tow cable 18 has internal wiring to actuate the acoustic source 12 and for transfer of signals received by sensors 20 back to the microprocessor and controller unit 26. A connection 30 is provided to transfer the water column sound speed profile data to the ship's combat system. This data is used to optimize sonar system performance including the depth of the towed array 14.

The features and advantages of the system are numerous. The system has an active acoustic source, which can be easily mounted into the front of a towed array using the power and signal electrical conductors already existing. Modifications to the hull of the ship are not required. Thin PVDF hydrophones can be built into the jacket of the tow cable with no impact to the electrical, optical or mechanical performance. As arrays are typically towed from Navy combatants, this sound speed profiling system requires only a modification to an existing system, and does not require an entire system development. Unlike the present alternative (XBT), which provides only the temperature profile, the sound speed profiling system directly, rapidly and continuously measures changes in the sound speed. This direct measurement allows accurate results even in shallow and littoral waters in which both temperature and salinity may be rapidly changing. Further, the sound speed profiling system allows the use of an omni-directional sound source, without the necessity of controlling or even knowing source-sensor angular relationship.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A sound speed profiling system comprising:

a towed sonar array;

a high-frequency sound source located on a forward end of said towed sonar array;

a tow cable attached to said towed sonar array and extending from the forward end of said towed sonar array to a vessel towing said towed sonar array;

a plurality of acoustic sensors attached to said tow cable; and a plurality of power and signal cables located within said tow cable and connected to and providing electrical power to said sound source and said plurality of sensors from the vessel and providing sensor signals from said sensors to a processor aboard said vessel, the sensor signals corresponding to an acoustic pulse from said sound source, the processor obtaining sound speed profiling information from arrival times of the sensor signals.

2. A sound speed profiling system as in claim 1 wherein said towed sonar array is a passive array.

3. A sound speed profiling system as in claim 2 wherein said high-frequency sound source has a transmitting frequency outside the bandwidth of the towed sonar array.

4. A sound speed profiling system as in claim 1 wherein said tow cable is a jacketed, electro-optical-mechanical tow cable.

5. A sound speed profiling system as in claim 4 wherein said jacketed, electro-optical-mechanical tow cable further comprises a cable having a jacket with a plurality of hydrophone sensors embedded therein.

6. A sound speed profiling system as in claim 1 wherein said plurality of sensors are a plurality of ceramic hydrophone elements.

7. A sound speed profiling system as in claim 1 wherein said plurality of sensors are a plurality of thin-film hydrophone membranes.

8. A sound speed profiling system as in claim 7 wherein said thin-film hydrophone membranes are formed with piezo-electric polymers.

9. A sound speed profiling system as in claim 8 wherein said piezo-electric polymers are polyvinylidene fluoride polymers.

10. A method for calculating a sound speed profile in a water column comprising:

attaching a plurality of acoustic transducers at known spacings along a tow cable of an acoustic towed array;

towing the towed array through the water column such that the towed array is substantially horizontal and the tow cable is at a known angle to the vertical within the water column;

producing an acoustic pulse from a source located at an end of the towed array adjacent the tow cable; and determining the sound speed profile of the water column adjacent the tow cable from the sensed arrival times of the acoustic pulse at each of the plurality of acoustic transducers.

\* \* \* \* \*